US012626603B2

(12) United States Patent
Baladhandapani et al.

(10) Patent No.: US 12,626,603 B2
(45) Date of Patent: May 12, 2026

(54) SYSTEM AND METHOD TO INTEGRATE VEHICLE INFORMATION FOR EFFECTIVE COORDINATED MISSIONS

(71) Applicant: Honeywell International Inc., Charlotte, NC (US)

(72) Inventors: Gobinathan Baladhandapani, Madurai (IN); Sunit Kumar Saxena, Marysville, OH (US); Vignesh K, Madurai (IN); Sivakumar Kanagarajan, Bangalore (IN); Karthikeyan Mariappan, Madurai (IN)

(73) Assignee: Honeywell International Inc., Charlotte, NC (US)

( * ) Notice: Subject to any disclaimer, the term of this patent is extended or adjusted under 35 U.S.C. 154(b) by 232 days.

(21) Appl. No.: 18/467,480

(22) Filed: Sep. 14, 2023

(65) Prior Publication Data

US 2025/0095499 A1 Mar. 20, 2025

(51) Int. Cl.
*G08G 5/25* (2025.01)
*G06V 20/17* (2022.01)
(Continued)

(52) U.S. Cl.
CPC ............... *G08G 5/25* (2025.01); *G06V 20/17* (2022.01); *G08G 5/21* (2025.01); *G08G 5/74* (2025.01); *G08G 5/80* (2025.01)

(58) Field of Classification Search
CPC .. G08G 5/25; G08G 5/21; G08G 5/74; G08G 5/80; G06V 20/17
(Continued)

(56) References Cited

U.S. PATENT DOCUMENTS

| | | | |
|---|---|---|---|
| 7,127,683 | B2 | 10/2006 | Royalty |
| 8,631,336 | B2 | 1/2014 | Cabaret et al. |

(Continued)

FOREIGN PATENT DOCUMENTS

| | | |
|---|---|---|
| CA | 2691640 C | 11/2015 |
| CN | 102270451 B | 5/2013 |

(Continued)

OTHER PUBLICATIONS

European Patent Office, "Extended European Search Report", dated Feb. 5, 2025, from EP Application No. 24195895.8, from Foreign Counterpart to U.S. Appl. No. 18/467,480, pp. 1 through 11, Published: EP.

*Primary Examiner* — Isaac G Smith
(74) *Attorney, Agent, or Firm* — Fogg & Powers LLC

(57) ABSTRACT

A method and system to integrate information in a coordinated mission of a group of user vehicles is provided. The method comprises storing a call sign in a database for each user vehicle, among the group of user vehicles, in the coordinated mission; and identifying a speaker vehicle among the user vehicles by comparing a call sign from parts of speech (POS) with the stored call signs. The method further comprises highlighting the identified speaker vehicle in a common display of each user vehicle; and determining whether the POS from the speaker vehicle contains a reference to a point of interest (POI). The method generates a graphical symbol for the POI when the POS from the speaker vehicle contains a reference to the POI, and tags the graphical symbol at a location of the POI in the common display of each user vehicle.

20 Claims, 4 Drawing Sheets

100

110 Storing a call sign in a database for each user vehicle, among a group of user vehicles, in a coordinated mission 112 Identifying a speaker vehicle among the user vehicles by comparing a call sign from parts of speech (POS) with the stored call signs 114 Highlighting the identified speaker vehicle in a common display of each user vehicle 116 Determining whether the POS from the speaker vehicle contains a reference to a point of interest (POI)

118 Generating a graphical symbol for the POI when the POS from the speaker vehicle contains a reference to the POI 120 Tagging the graphical symbol at a location of the POI in the common display of each user vehicle

(51) Int. Cl.

| | | |
|---|---|---|
| *G08G 5/21* | (2025.01) | |
| *G08G 5/74* | (2025.01) | |
| *G08G 5/80* | (2025.01) | |

(58) Field of Classification Search

USPC ............................................................ 701/3

See application file for complete search history.

(56) References Cited

U.S. PATENT DOCUMENTS

| | | | |
|---|---|---|---|
| 8,723,670 | B2 | 5/2014 | Rabey |
| 9,083,808 | B2 * | 7/2015 | Penberthy ............... G10L 17/00 |
| 9,105,183 | B2 | 8/2015 | Samuthirapandian et al. |
| 9,430,949 | B1 * | 8/2016 | Nelson ................ G10L 21/0208 |
| 9,704,405 | B2 | 7/2017 | Kashi et al. |
| 10,078,645 | B2 * | 9/2018 | Har-Noy ............. G06F 3/04842 |
| 10,157,616 | B2 | 12/2018 | Agarwal et al. |
| 10,847,145 | B2 | 11/2020 | Lafon et al. |
| 11,023,547 | B2 | 6/2021 | Chalouhi et al. |
| 11,030,908 | B2 | 6/2021 | Maddanimath |
| 2007/0285505 | A1 * | 12/2007 | Korneliussen ......... H04N 7/147 |
| | | | 348/E7.083 |
| 2009/0138521 | A1 | 5/2009 | Buster |
| 2012/0022774 | A1 | 1/2012 | Pinheiro et al. |
| 2017/0206790 | A1 * | 7/2017 | Reddy ...................... G08G 5/74 |
| 2018/0129635 | A1 * | 5/2018 | Saptharishi ......... G06F 3/04817 |
| 2019/0147858 | A1 * | 5/2019 | Letsu-Dake .......... G10L 15/063 |
| | | | 704/275 |
| 2020/0172264 | A1 | 6/2020 | Das et al. |
| 2020/0251002 | A1 * | 8/2020 | Balasubramanian .... G08G 5/80 |
| 2021/0019545 | A1 | 1/2021 | Constantino et al. |

FOREIGN PATENT DOCUMENTS

| | | | |
|---|---|---|---|
| EP | 2290924 | A1 | 3/2011 |
| EP | 3321916 | A2 | 5/2018 |
| EP | 3693947 | A1 | 8/2020 |
| JP | 2021033944 | A | 3/2021 |

* cited by examiner

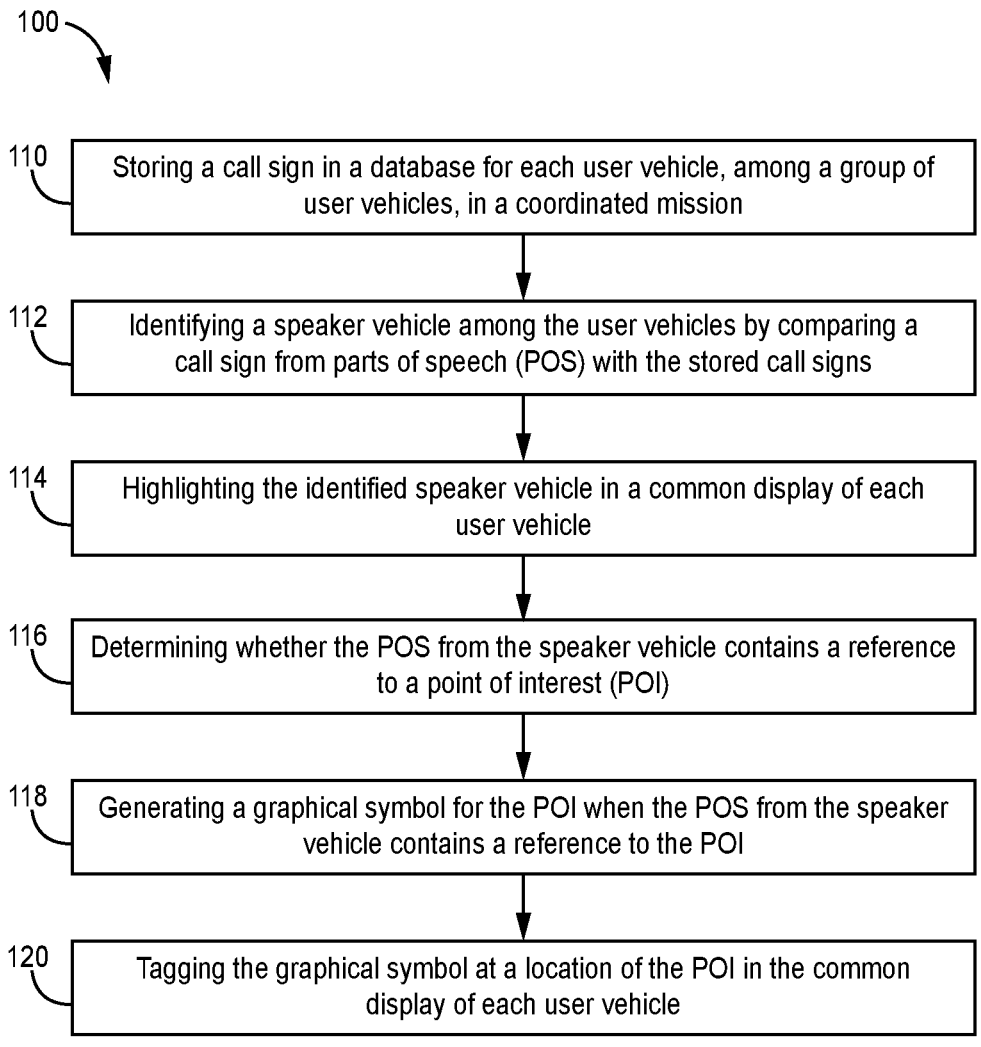

100

110 — Storing a call sign in a database for each user vehicle, among a group of user vehicles, in a coordinated mission 112 — Identifying a speaker vehicle among the user vehicles by comparing a call sign from parts of speech (POS) with the stored call signs 114 — Highlighting the identified speaker vehicle in a common display of each user vehicle 116 — Determining whether the POS from the speaker vehicle contains a reference to a point of interest (POI)

118 — Generating a graphical symbol for the POI when the POS from the speaker vehicle contains a reference to the POI 120 — Tagging the graphical symbol at a location of the POI in the common display of each user vehicle

SYSTEM AND METHOD TO INTEGRATE VEHICLE INFORMATION FOR EFFECTIVE COORDINATED MISSIONS

BACKGROUND

Search and rescue (SAR) operations play an important role in reducing devastating impacts caused by disasters. Aerial vehicles are often deployed during missions to analyze a region and obtain the necessary information before proceeding to ground.

In coordinated missions such as SAR, or formation flying, information sharing is challenging due to various reasons. For example, communications are done through radio telephony (RT), which is a broadcast type of communication where only one speaker can talk at a given time while others listen. When there are a number of vehicles in mission, it is difficult for all vehicle operators to explain their view/details when needed. Further, when the vehicle operators want to share information, this consumes more RT time, which in turn creates RT congestion. There are also additional problems specific to formation flying. For example, when an aircraft in the formation has an issue, the other aircraft in mission should be notified immediately as these aircraft are typically flying with minimum separation. Currently, a pilot having the aircraft issue must inform the other aircraft through RT, which might not be available.

SUMMARY

A method and system to integrate information in a coordinated mission of a group of user vehicles is described herein. The method comprises storing a call sign in a database for each user vehicle, among the group of user vehicles, in the coordinated mission; and identifying a speaker vehicle among the user vehicles by comparing a call sign from parts of speech (POS) with the stored call signs. The method further comprises highlighting the identified speaker vehicle in a common display of each user vehicle; and determining whether the POS from the speaker vehicle contains a reference to a point of interest (POI). The method generates a graphical symbol for the POI when the POS from the speaker vehicle contains a reference to the POI, and tags the graphical symbol at a location of the POI in the common display of each user vehicle.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 1 is a flow diagram for a method to integrate information for a coordinated mission of user vehicles, according to one implementation;

DETAILED DESCRIPTION

Figure 2:
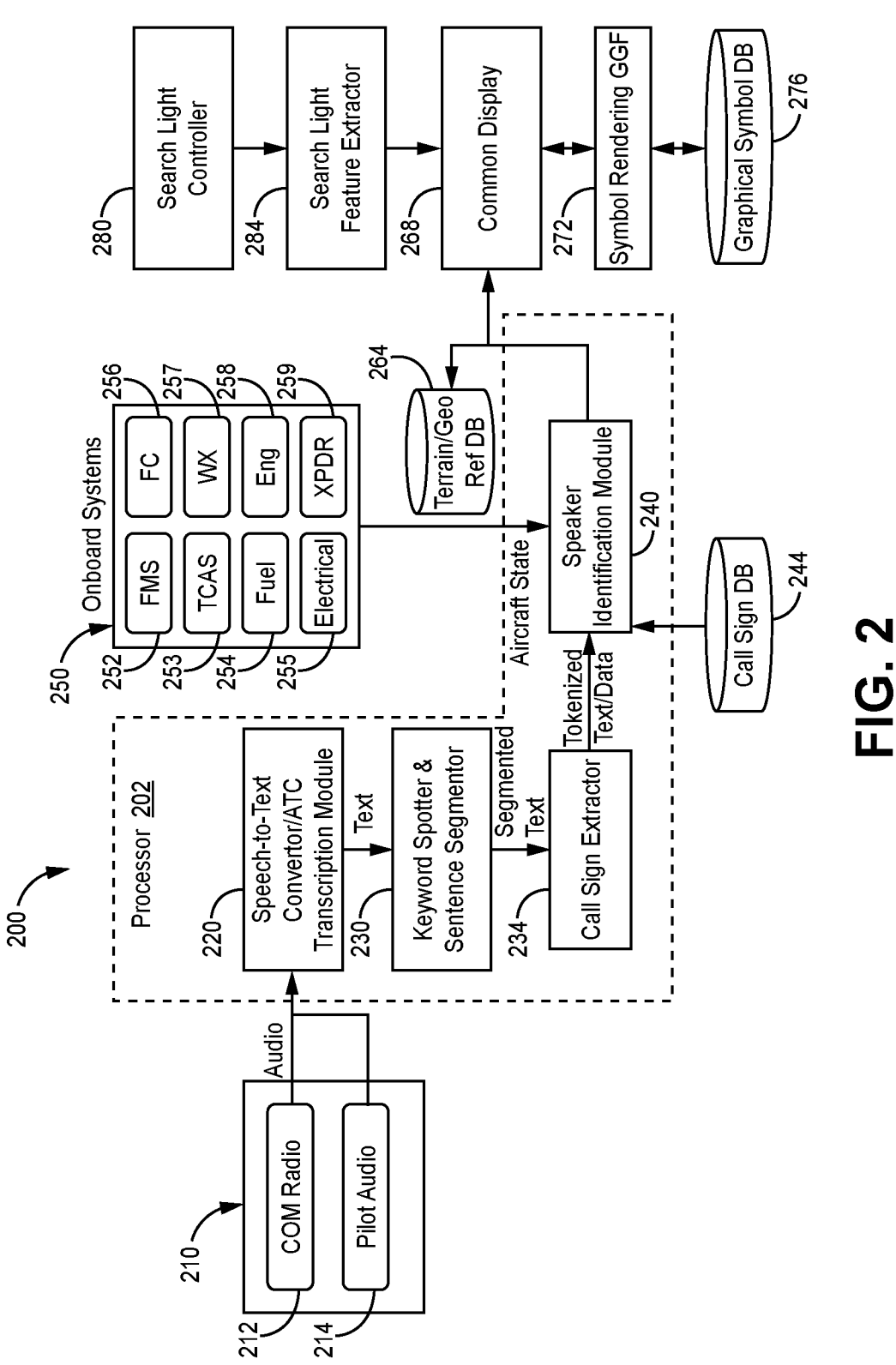
FIG. 2 is a block diagram of a system to integrate information in a coordinated mission for a fleet of aerial vehicles, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system to integrate vehicle systems for effective coordinated missions are described herein.

In general, the present method and system are operative to identify a speaker vehicle among user vehicles in a mission, obtain a location of the speaker vehicle, and highlight features on a common display in each user vehicle. The method and system can also enable the speaker vehicle to share its camera feed or captured point of interest (POI) with the other user vehicles through the common display in each user vehicle. The user vehicles in the mission can include various combinations of manned or unmanned vehicles, such as airplanes, helicopters, urban air mobility (UAM) vehicles, and the like.

The present method and system increase a coordinated mission's effectiveness by automatic identification of a particular user vehicle, such as a speaker aircraft, based on a call sign annunciation and mapping the call sign with the transponder data for the particular user vehicle, such as automatic dependent surveillance-broadcast (ADS-B) data for the speaker aircraft. For example, once the transponder data is derived through call sign filtering, the transponder data is mapped, along with data extracted from clearances, into various avionics systems. After successfully identifying the particular user vehicle, the present method and system directs the common display of each user vehicle in the mission to show various unique features.

The common display implementation used in the present method and system can provide various features, including: mapping the call sign annunciations from the radio transmissions with a speaker aircraft's transponder data; speaker identification based on call sign; tagging/highlighting the speaker aircraft in the common displays; changing the common display view to the speaker's data/POI; populating a graphical symbol based on speaker transcription and tag the graphical symbol to the POI; and identifying and storing a geographical feature near to the POI that is visible at higher altitude and poor visibility.

In another aspect, when a speaker aircraft is asking for emergency help (e.g., mayday) the present method maps a call sign of the speaker aircraft with its aircraft transponder data (such as ADS-B data), and then performs the following steps: identify the location of the speaker aircraft, and change the common displays in all aircraft in mission to show an icon of the speaker aircraft. In addition, during an emergency situation, the common displays can show the camera feed along with other vital information, such as speed, altitude, type of failure, and the like, of the distressed aircraft. The method quickly recognizes and responds, just based on the call sign, to the aircraft that is asking for emergency help. The method then supplies the traffic aircraft identification to various avionics of other aircraft.

The present approach can reduce the workload of vehicle operators such as pilots by significantly reducing the time to explain the POI situation and sharing their ownship identity.

This enables highly effective and time efficient group communications, such for various airplanes flying together on a mission.

The present approach for aircraft identification, based on call signs and locating the aircraft based on an ADS-B profile, has various use cases. For example, current traffic displays (e.g., traffic collision avoidance system (TCAS)) operate based on transponder data, and voice data is not taken into account. The present method can highlight an aircraft that is talking in such traffic displays. In addition, the present method can be used to highlight a distressed aircraft and share its cockpit profile to other aircraft flying in the same region.

In addition, when a flight management system (FMS) of aircraft is already provided with search and rescue (SAR) patterns, tagging/highlighting the speaker aircraft along with the POI will strengthen the SAR patterns usage. The present method can also be used to strengthen a surface indications and alert (SURF-IA) system. Currently, SURF-IA works only based on ADS-B data. Incorporating voice data after call sign filtering can strengthen the SURF-IA operation. The present method also addresses the single pilot operational issue by sending critical data to other user aircraft through the common displays.

Further, the graphical symbol association to the POI of the present method can help pilots in a mission to increase their overall awareness of a search area, and ensures that everyone knows the overall findings in the search area. Moreover, the call sign-based aircraft identification and data sharing via the common displays can help in improving the enhancement of various avionics devices.

Further details regarding the present method and system are described as follows with reference to the drawings.

FIG. 1 is a flow diagram for a method 100 to integrate information for an effective coordinated mission, according to one implementation. The method 100 comprises storing a call sign in a database for each user vehicle, among a group of user vehicles, for use in a coordinated mission (block 110). The method 100 further comprises identifying a speaker vehicle among the user vehicles by comparing a call sign from parts of speech (POS) with the stored call signs (block 112); and highlighting the identified speaker vehicle in a common display of each user vehicle (block 114). The method 100 then determines whether the POS from the speaker vehicle contains a reference to a point of interest (POI) (block 116); and generates a graphical symbol for the POI when the POS from the speaker vehicle contains a reference to the POI (block 118). The method 100 then provides for tagging the graphical symbol at a location of the POI in the common display of each user vehicle (block 120).

In some implementations, when the graphical symbol is tagged at the location of the POI, method 100 can identify at least one nearby ground feature that is visible at a higher altitude, and can tag the nearby ground feature in the common display of each user vehicle to aid in locating the POI. In addition, method 100 can also provide for sharing a video feed of the speaker vehicle with the other user vehicles via the common display in each user vehicle. In further implementations, method 100 can further provide for marking a coverage area of the mission in the common display for each user vehicle, and adjusting one or more parameters of the mission based on the coverage area and one or more potential POI regions.

FIG. 2 is a block diagram of a system 200 to integrate information in a coordinated mission for a fleet of user vehicles, according to one embodiment. The user vehicles can include various aerial vehicles, such as manned or unmanned aircraft, helicopters, UAM vehicles, or the like. The various components of system 200 can be located onboard the user vehicles, in a ground station, or both.

The system 200 includes a communication unit 210 that hosts a communication (COM) radio 212, and a user (pilot) audio module 214. At least one processor 202 is in operative communication with communication unit 210. The processor 202 hosts a plurality of processing modules described further hereafter.

The COM radio 212 and audio module 214 are configured to send audio signals. Examples of various audio signals that can be transmitted include ATC clearance audio, automatic terminal information service (ATIS) messages, aerodrome flight information service (AFIS) messages, terminal weather information for pilots (TWIP) messages, airport operation center (AOC) messages, pilot voice commands, and the like.

A first processing module hosted by processor 202 comprises a speech-to-text converter module 220, such as an air traffic control (ATC) transcription module, which is configured to receive the audio signals from COM radio 212 and audio module 214. The speech-to-text converter module 220 is operative to convert the received audio signals to corresponding text messages.

A second processing module comprises a keyword spotter and sentence segmentor module 230, which is configured to receive the corresponding text messages from speech-to-text converter module 220. The keyword spotter and sentence segmentor module 230 is operative to analyze the received text messages for selected words and to segment the text to provide parts of speech (POS) that include a call sign and/or voice data.

A third processing module comprises a call sign extractor module 234, which is configured to receive the segmented text from keyword spotter and sentence segmentor module 230. The call sign extractor module 234 is operative to identify the call sign from the segmented text and produce corresponding call sign data.

A fourth processing module comprises a speaker identification module 240, which is configured to receive the call sign data and/or voice data from call sign extractor module 234. The speaker identification module 240 operative to identify a speaker vehicle among the user vehicles by comparing the call sign data with stored call signs from a call sign database (DB) 244.

Various onboard user vehicle systems 250 are in operative communication with speaker identification module 240. The onboard user vehicle systems 250 are configured to send vehicle state data, such as aircraft state data, to speaker identification module 240. The onboard user vehicle systems 250 can include a flight management system (FMS) 252, a traffic collision avoidance system (TCAS) 253, a fuel monitoring system 254, electrical systems 255, a flight computer (FC) 256, a weather (WX) monitoring system 257, engine systems 258, a transponder (XPDR) 259, or the like.

A common display 268 onboard each of the user vehicles is in operative communication with speaker identification module 240. The common display 268 is configured to receive identifying information for the speaker vehicle from speaker identification module 240. In addition, a terrain/geographical reference database 264 can be in operative communication with speaker identification module 240 and common display 268.

A symbol rendering unit 272, such as a symbol rendering graphics generation function (GGF), is in operative communication with common display 268, and with a graphical symbol database 276. The symbol rendering unit 272 is operative to provide rendering data for generating one or more graphical symbols on common display 268. The graphical symbol database 276 provides data for the graphical symbols to be rendered.

Optionally, a search light controller 280 is configured to send control signals to a search light feature extractor 284. The common display 268 is configured to receive search light data from search light feature extractor 282, which uses a search light and camera feed to identify a point of interest.

In an operational method for a coordinated mission of an aircraft group, which can employ system 200, each of the aircraft are dialed to a common radio frequency (RF). The call signs for each aircraft are already stored in selected databases, such as call sign database 244. When an audio message is provided, such as by communication unit 210, the processing modules transcribe the audio message to text, perform pre- and post-processing of the audio signals, and identify parts of speech (POS), such as by using speech-to-text converter module 220, keyword spotter and sentence segmentor module 230, and call sign extractor module 234. The method can identify a speaker aircraft by comparing the call sign from the POS with the stored call signs, to find the corresponding call sign of the speaker aircraft. This comparison step can be done by speaker identification module 240.

For example, COM radio 212 and/or audio module 214 can transmit audio signals to speech-to-text converter module 220, which sends corresponding text messages to keyword spotter and sentence segmentor module 230. The keyword spotter and sentence segmentor module 230 analyzes the received text for selected words and segment the text in order to provide POS including a call sign. The call sign extractor module 234 receives the segmented text from keyword spotter and sentence segmentor module 230. The call sign extractor module 234 identifies the call sign from the segmented text and transmits corresponding tokenized text/data to speaker identification module 240. The speaker identification module 240 receives information from call sign database 244. The speaker identification module 240 identifies a speaker aircraft by comparing the call sign with stored call signs from call sign database 244. The speaker identification module 240 then sends identifying information to terrain/geographical reference database 264, and also to common display 268.

Once the speaker aircraft is identified, the method can obtain any available ADS-B out data for the speaker aircraft. The method then highlights the speaker aircraft in the common display of each aircraft. In addition, the method can mark a coverage area based on the ADS-B out data for all the aircraft in the mission, and can suggest a mission plan change based on an area coverage potential POI region.

Data regarding the identified speaker aircraft can be supplied to various avionics in the aircraft in the mission through appropriate bus interfaces. Useful data, such as speed, altitude, heading, etc., obtained from clearance information, can be made available to the various avionics in the aircraft through a common digital database.

In one example, if the POS contains a reference feature, such as tent, wing, person, etc., then the method generates a corresponding graphical symbol and tags the graphical symbol in the location of a POI. If the POI is tagged, the method identifies a nearby ground feature, which is visible even at a poor visibility higher altitude, and tags that nearby ground feature to locate the POI. If the POI is tagged, the method captures the speaker aircraft location, altitude, viewing angle, and tag, along with the POI. If the speaker aircraft wants to share its point of view, the method enables an option to share the captured video with the other aircraft via the common displays.

In addition, a POI position can be tagged graphically on the common display by either the pilot speaking audio, or by selecting from symbols available on the common display.

In other implementations, a speech engine can be used to filter a call sign from a speaker aircraft. Then, the call sign can be confirmed in flight during a mission (e.g., during SAR, formation flying, etc.). For example, once the call sign is identified, ADS-B out data can be obtained from the a speaker aircraft to determine its position during flight. If an aircraft during formation flying has an emergency situation, a list of emergency parameters for the aircraft can be shown in the common displays of the other aircraft in the formation so that they can adjust the mission as needed, and provide aid for the aircraft in the emergency situation.

Figures 3A, 3B:
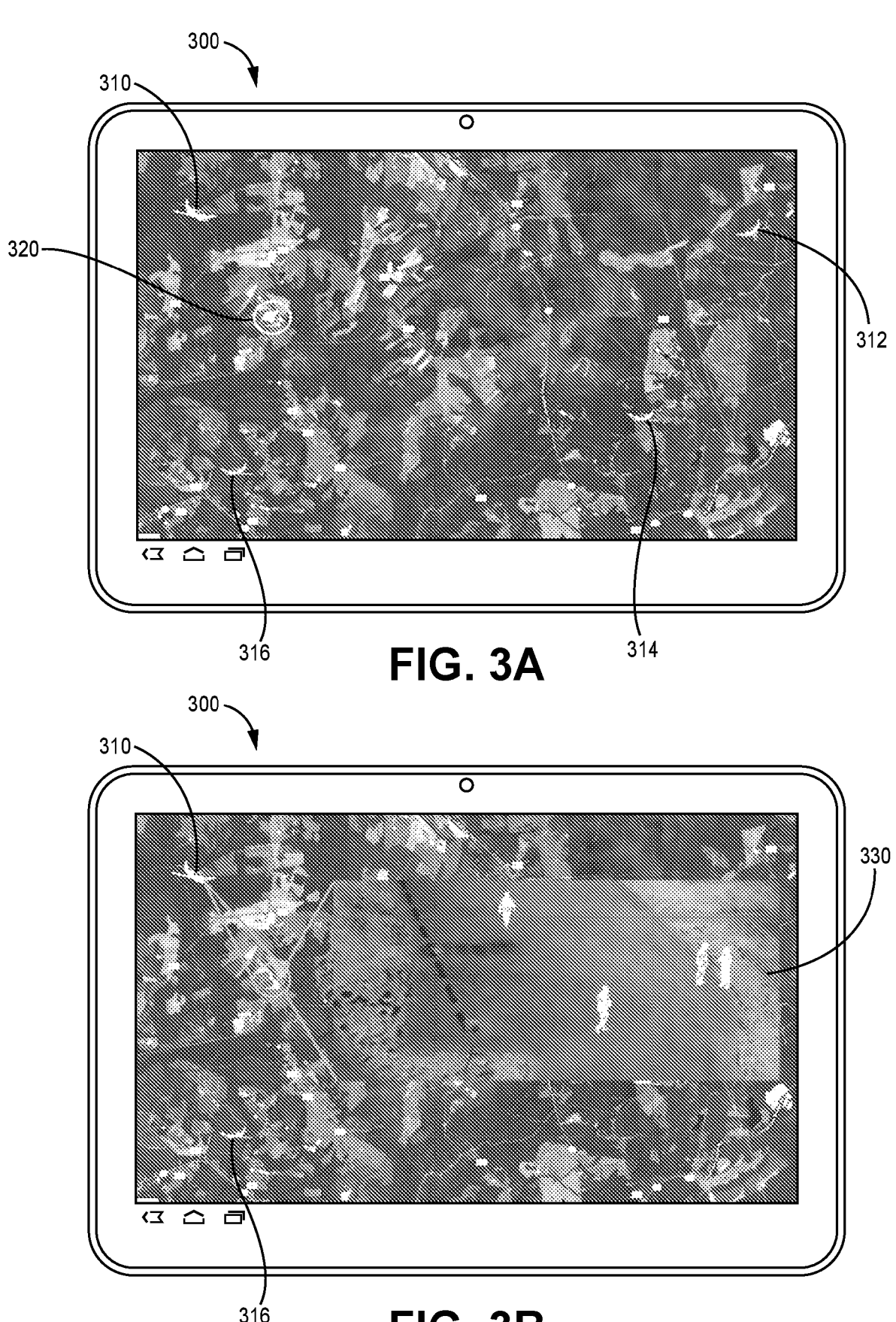
FIGS. 3A and 3B are example screenshots of a common display for a user aircraft on a mission with other aircraft.

FIG. 3A is an example screenshot of a common display 300 for a user aircraft on a mission with other aircraft. As depicted, a graphically highlighted speaker aircraft 310 is shown symbolically, and a graphical symbol 320 (tent) is rendered from a symbol table, according to the present approach. Other aircraft 312, 314, 316 in the mission are also shown symbolically on common display 300. FIG. 3B is an example screenshot of common display 300, which shows the highlighted speaker aircraft 310, along with a rendering of an image feed 330 of a search area as seen from speaker aircraft 310. The image feed 330 is shared with the other aircraft in the mission on their respective common displays, according to the present approach.

Figure 4:
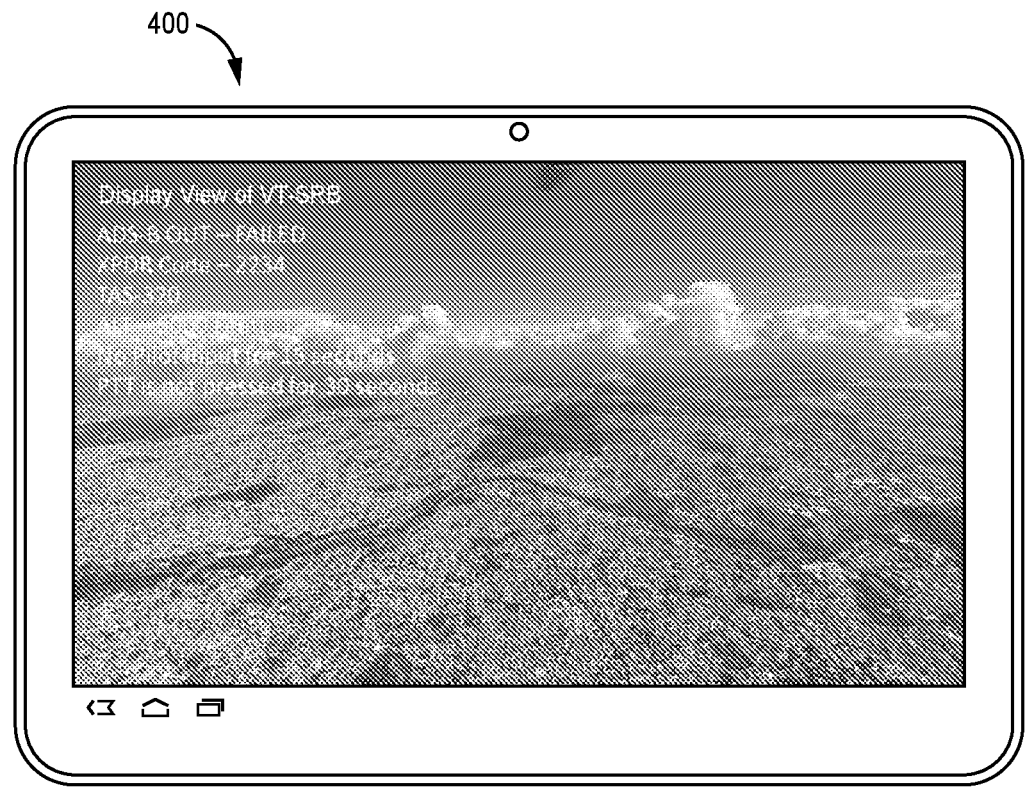
FIG. 4 is an example screenshot of a common display for a user aircraft on a mission with other aircraft, showing a list of emergency parameters for one of the aircraft that is in an emergency situation.

FIG. 4 is an example screenshot of a common display 400 for a user aircraft in a group of aircraft on a mission, which shows a list of emergency parameters for one of the aircraft that is in an emergency situation. In this example, the emergency parameters listed include:

Display View of VT-SRB (identifies view from aircraft in emergency situation by its call sign);

ADS-B OUT—FAILED (failure of ADS-B out feature of aircraft in emergency situation);

XPDR Code—2234 (transponder code from aircraft in emergency situation);

TAS—320 (true airspeed of aircraft in emergency situation);

ALT—5000 Feet (altitude of aircraft in emergency situation);

No Pilot Input for 15 seconds (time of no input by pilot of aircraft in emergency situation);

PTT is not pressed for 30 seconds (time push-to-talk (PPT) feature not used by pilot of aircraft in emergency situation).

A computer or processor used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present systems and methods.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a method comprising: storing a call sign in a database for each user vehicle, among a group of user vehicles, in a coordinated mission; identifying a speaker vehicle among the user vehicles by comparing a call sign from parts of speech (POS) with the stored call signs; highlighting the identified speaker vehicle in a common display of each user vehicle; determining whether the POS from the speaker vehicle contains a reference to a point of interest (POI); generating a graphical symbol for the POI when the POS from the speaker vehicle contains a reference to the POI; and tagging the graphical symbol at a location of the POI in the common display of each user vehicle.

Example 2 includes the method of Example 1, wherein when the graphical symbol is tagged at the location of the POI, identifying at least one nearby ground feature that is visible at a higher altitude, and tagging the nearby ground feature in the common display of each user vehicle to aid in locating the POI.

Example 3 includes the method of any of Examples 1-2, further comprising: sharing a video feed of the speaker vehicle with other user vehicles in the group via the common display in each user vehicle.

Example 4 includes the method of any of Examples 1-3, wherein the user vehicles comprise a fleet of aerial vehicles.

Example 5 includes the method of Example 4, wherein the aerial vehicles comprise manned aircraft, unmanned aircraft, helicopters, or urban air mobility vehicles.

Example 6 includes a system to integrate information in a coordinated mission of a plurality of user vehicles, the system comprising: a communication unit that hosts a communication radio, and a user audio module; at least one processor in operative communication with the communication unit, the at least one processor hosting a plurality of processing modules comprising: a speech-to-text converter module configured to receive audio signals from the communication radio and the user audio module, and convert the audio signals to corresponding text messages; a keyword spotter and sentence segmentor module configured to receive the corresponding text messages from the speech-to-text converter module, the keyword spotter and sentence segmentor module operative to analyze the received text messages for selected words and to segment the text to provide parts of speech (POS) that include a call sign and/or voice data; a call sign extractor module configured to receive the segmented text from the keyword spotter and sentence segmentor module, the call sign extractor module operative to identify the call sign from the segmented text and produce corresponding call sign data; and a speaker identification module configured to receive the call sign data and/or voice data from the call sign extractor module, the speaker identification module operative to identify a speaker vehicle among the user vehicles by comparing the call sign data with stored call signs from a call sign database; one or more onboard user vehicle systems in operative communication with the speaker identification module, the one or more onboard user vehicle systems configured to send vehicle state data to the speaker identification module; a common display onboard each of the user vehicles and in operative communication with the speaker identification module, the common display configured to receive identifying information for the speaker vehicle from the speaker identification module; and a symbol rendering unit in operative communication with the common display and with a graphical symbol database, the symbol rendering unit operative to provide rendering data for generating one or more graphical symbols on the common display.

Example 7 includes the system of Example 6, further comprising a terrain/geographical reference database in operative communication with the speaker identification module and the common display.

Example 8 includes the system of any of Examples 6-7, further comprising a search light controller configured to send control signals to a search light feature extractor.

Example 9 includes the system of Example 8, wherein the common display is configured to receive search light data from the search light feature extractor.

Example 10 includes the system of any of Examples 6-9, wherein the user vehicles comprise a fleet of aerial vehicles.

Example 11 includes the system of Example 10, wherein the aerial vehicles comprise manned aircraft, unmanned aircraft, helicopters, or urban air mobility vehicles.

Example 12 includes the system of any of Examples 6-11, wherein the speech-to-text converter module comprises an air traffic control (ATC) transcription module.

Example 13 includes the system of any of Examples 6-12, wherein the audio signals comprise one or more of ATC clearance audio, pilot voice commands, automatic terminal information service (ATIS) messages, airport operation center (AOC) messages, aerodrome flight information service (AFIS) messages, or terminal weather information for pilots (TWIP) messages.

Example 14 includes the system of any of Examples 6-13, wherein the onboard user vehicle systems comprise one or more of a flight management system, a traffic collision avoidance system (TCAS), a fuel monitoring system, electrical systems, a flight computer, a weather monitoring system, engine systems, or a transponder.

Example 15 includes the system of any of Examples 6-14, wherein the speaker vehicle is graphically highlighted in the common display of each user vehicle.

Example 16 includes the system of any of Examples 6-15, wherein when a user vehicle among the user vehicles is in an emergency situation, the common display in each user vehicle is configured to show a list of emergency parameters for the user vehicle in the emergency situation.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method comprising:

storing a plurality of aviation call signs in a call sign database, each of the aviation call signs identifying a respective user aerial vehicle among a group of user aerial vehicles in a coordinated mission;

identifying a speaker vehicle among the user aerial vehicles by comparing the aviation call sign from parts of speech (POS) from the speaker vehicle with the stored aviation call signs;

highlighting the identified speaker vehicle in a common display of each user aerial vehicle;

determining whether the POS from the speaker vehicle contains a reference to a point of interest (POI);

generating a graphical symbol for the POI when the POS from the speaker vehicle contains a reference to the POI; and tagging the graphical symbol at a location of the POI in the common display of each user aerial vehicle.

2. The method of claim 1, wherein when the graphical symbol is tagged at the location of the POI, identifying at least one nearby ground feature that is visible at a higher altitude, and tagging the nearby ground feature in the common display of each user aerial vehicle to aid in locating the POI.

3. The method of claim 1, further comprising:

sharing a video feed of the speaker vehicle with other user aerial vehicles in the group via the common display in each user aerial vehicle.

4. The method of claim 1, wherein the user aerial vehicles comprise a fleet of aerial vehicles.

5. The method of claim 1, wherein the user aerial vehicles comprise manned aircraft, unmanned aircraft, helicopters, or urban air mobility vehicles.

6. A system to integrate information in a coordinated mission of a plurality of user aerial vehicles, the system comprising:

a communication unit that hosts a communication radio, and a user audio module;

a call sign database configured to store a plurality of aviation call signs identifying respective user aerial vehicles among the plurality of user aerial vehicles in the coordinated mission;

at least one processor in operative communication with the communication unit, the at least one processor hosting a plurality of processing modules comprising:

a speech-to-text converter module configured to receive audio signals from the communication radio and the user audio module, and convert the audio signals to corresponding text messages;

a keyword spotter and sentence segmentor module configured to receive the corresponding text messages from the speech-to-text converter module, the keyword spotter and sentence segmentor module operative to analyze the received text messages for selected words and to segment the text to provide parts of speech (POS) that include an aviation call sign and/or voice data;

a call sign extractor module configured to receive the segmented text from the keyword spotter and sentence segmentor module, the call sign extractor module operative to identify the aviation call sign from the segmented text and produce corresponding call sign data; and a speaker identification module configured to receive the call sign data and/or voice data from the call sign extractor module, the speaker identification module operative to identify a speaker vehicle among the user aerial vehicles by comparing the call sign data with the stored aviation call signs from the call sign database;

one or more onboard user vehicle systems in operative communication with the speaker identification module, the one or more onboard user vehicle systems configured to send vehicle state data to the speaker identification module;

a common display onboard each of the user aerial vehicles and in operative communication with the speaker identification module, the common display configured to receive identifying information for the speaker vehicle from the speaker identification module; and a graphical symbol database in operative communication with the common display onboard each of the user aerial vehicles.

7. The system of claim 6, further comprising a terrain/geographical reference database in operative communication with the speaker identification module and the common display.

8. The system of claim 6, further comprising a search light controller configured to send control signals to a search light feature extractor.

9. The system of claim 8, wherein the common display is configured to receive search light data from the search light feature extractor.

10. The system of claim 6, wherein the user aerial vehicles comprise a fleet of aerial vehicles.

11. The system of claim 6, wherein the user aerial vehicles comprise manned aircraft, unmanned aircraft, helicopters, or urban air mobility vehicles.

12. The system of claim 6, wherein the speech-to-text converter module comprises an air traffic control (ATC) transcription module.

13. The system of claim 6, wherein the audio signals comprise one or more of ATC clearance audio, pilot voice commands, automatic terminal information service (ATIS) messages, airport operation center (AOC) messages, aerodrome flight information service (AFIS) messages, or terminal weather information for pilots (TWIP) messages.

14. The system of claim 6, wherein the onboard user vehicle systems comprise one or more of a flight management system, a traffic collision avoidance system (TCAS), a fuel monitoring system, electrical systems, a flight computer, a weather monitoring system, engine systems, or a transponder.

15. The system of claim 6, wherein the speaker vehicle is graphically highlighted in the common display of each user aerial vehicle.

16. The system of claim 6, wherein when a user aerial vehicle among the user aerial vehicles is in an emergency situation, the common display in each user aerial vehicle is configured to show a list of emergency parameters for the user aerial vehicle in the emergency situation.

17. The method of claim 1, further comprising:

sending control signals to a search light feature extractor; and receiving search light data from the search light feature extractor, which uses a search light and camera feed to identify the POI.

18. The method of claim 1, further comprising:

mapping the aviation call sign with transponder data for the speaker vehicle.

19. The method of claim 18, wherein the transponder data includes automatic dependent surveillance-broadcast (ADS-B) data for the speaker vehicle.

20. The system of claim 6, wherein in response to determining that POS from the speaker vehicle contains a reference to a point of interest (POI), generating a graphical symbol on the common display in each user aerial vehicle, and tagging the graphical symbol at a location of the POI in the common display.

* * * * *